United States Patent Office 3,061,747
Patented Oct. 30, 1962

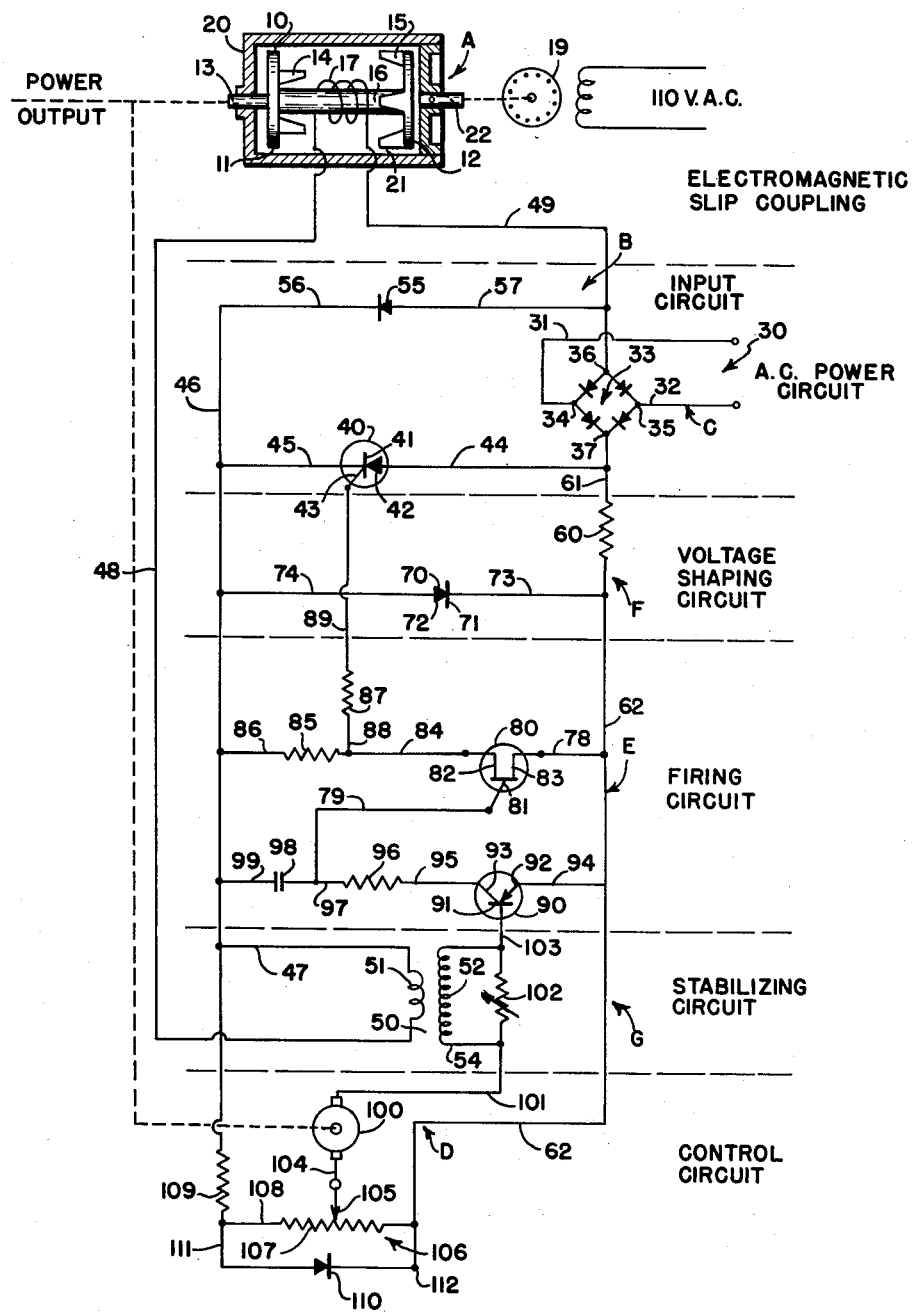

3,061,747
VARIABLE-SPEED DRIVES
David W. Schlicher, Minneapolis, Minn., assignor to Electric Machinery Mfg., Company, Minneapolis, Minn., a corporation of Minnesota
Filed Feb. 24, 1960, Ser. No. 10,712
9 Claims. (Cl. 310—95)

The herein disclosed invention relates to variable-speed drives and has for an object to provide a variable speed drive utilizing an electro-magnetic slip coupling and in which response is extremely rapid and positive.

Another object of the invention resides in providing a variable-speed drive in which the disadvantages of the presently used drives is eliminated.

A still further object of the invention resides in providing a variable-speed drive having no moving parts in the control section.

Another object of the invention resides in providing the drive with an input circuit connected to the winding of the electro-magnetic slip coupling and in utilizing a silicon controlled rectifier operated from a bridge rectifier connected to a single-phase alternating-current power line and producing current pulses for energizing the winding of the coupling.

A still further object of the invention resides in utilizing a shaping circuit for converting the pulses of said alternating current into direct current for use with certain of the circuits of the invention.

Another object of the invention resides in providing a firing circuit utilizing a silicon unijunction transistor functioning as an oscillator and serving to fire the silicon controlled rectifier.

A feature of the invention resides in energizing the silicon unijunction transistor from the output voltage of the silicon controlled rectifier to cause said rectifier to fire once only during each pulse of the power current.

An object of the invention resides in providing a transistor in said firing circuit actuating said silicon unijunction transistor and associated with timing means for causing the silicon controlled rectifier to fire at various times during the pulse cycle.

A still further object of the invention resides in providing a control circuit including a tachometer driven by the electro-magnetic slip coupling and connected to the last-named transistor and to an adjustable resistor which in turn is connected to a suitable source of reference voltage.

Another object of the invention resides in providing a stabilizing circuit for compensating for fluctuations in the speed of the electro-magnetic slip coupling.

Other objects of the invention reside in the combination and arrangement of parts and in the details of construction hereinafter illustrated and/or described.

The drawing is a wiring diagram illustrating an embodiment of the invention.

The invention utilizes an electro-magnetic slip coupling A and to which is connected an input circuit B. This circuit derives electrical energy from a power circuit C which produces unidirectional half-wave power pulses used to energize the electro-magnetic slip coupling. The speed of the electro-magnetic slip coupling is controlled by means of a control circuit D which actuates a firing circuit E. This circuit in turn determines the portion of the period of each pulse utilized in the energization of the electro-magnetic slip coupling and which produces the desired speed of the coupling. A voltage shaping circuit F operating in conjunction with the input circuit B produces a direct current employed in the energization of certain of the circuits of the invention. Accurate speed stability of the electro-magnetic slip coupling is procured by a stabilizing circuit G actuated by variations in speed of said coupling. The electro-magnetic slip coupling and associated circuits will now be described in detail.

The electro-magnetic slip coupling A comprises a rotor 10 consisting of two core units 11 and 12, mounted on a shaft 13. This shaft serves as the driven shaft of the coupling. The core units 11 and 12 have facing poles 14 and 15 which when the units are brought together alternate with one another and are separated from one another. A central core 16 extends between the units 11 and 12 and is magnetically connected thereto. Mounted on the core 16 is a winding 17 which produces, when energized with unidirectional current, adjacent poles of opposite polarity. Encircling the rotor 10 is an annulus 20 which is spaced from the rotor 10 by means of an air gap 21 and which completes the magnetic circuit through the poles 14 and 15 and which is mounted for rotation on a shaft 22. This shaft is driven by an electric motor 19, which may be of any suitable construction. The speed of the shaft 13 will differ from that of shaft 22 depending on the amount of current passing through the winding 17. Slip couplings of the type referred to being well known in the art, the details of construction of the coupling have not been shown or described in this application.

The power circuit C comprises a line 30 consisting of two conductors 31 and 32 connected to a suitable source of single-phase alternating current. In this circuit is disposed a full-wave bridge-type rectifier 33 having input terminals 34 and 35 and output terminals 36 and 37. The two conductors 31 and 32 of line 30 are connected to the terminals 34 and 35.

The input circuit B is built around a silicon controlled rectifier 40 having a cathode 41, an anode 42 and a gate 43. The anode 42 is connected by means of a conductor 44 to terminal 37 of the rectifier 33. The cathode 41 is connected by means of a conductor 45 to a common feed conductor 46. To the common conductor 46 is connected a conductor 47 which in turn is connected to the primary 51 of a transformer 50. This transformer has a secondary 52 and the purpose of this transformer forming part of the stabilizing circuit G will be subsequently more fully explained. The primary 51 is further connected by means of a conductor 48 to one end of the winding 17 of the electro-magnetic slip coupling A while the other end of said winding is connected by means of a conductor 49 to the terminal 36 of rectifier 33.

The voltage shaping circuit F utilizes a voltage dropping resistor 60 which is connected at one end by means of a conductor 61 to the conductor 44 and which in turn is connected to the terminal 37 of the bridge rectifier 33. The other end of said resistor is connected to a common return conductor 62 and to which various other parts of the drive are connected. The cathode 71 of a Zener diode 70 is connected by means of a conductor 73 to the conductor 62, while the anode 72 of this diode is connected by means of a conductor 74 to the common feed conductor 46. The resistor 60 and diode 70 shapes the pulses produced by circuit C and makes a flat-top clipped pulse resulting in direct current suitable for the purpose.

The firing circuit E utilizes a silicon unijunction transistor 80 having an emitter 81 a first base 82 and a second base 83. Base 82 is connected by means of a conductor 84 to a dropping resistor 85 which is connected by means of a conductor 86 to the condctor 46. A second resistor 87 is connected by means of a conductor 88 to conductor 84 and by means of another conductor 89 to the gate 43 of the silicon controlled rectifier 40. Base 83 is connected to conductor 62 by means of a conductor 78. The unijunction transistor 80 functions as a relaxation oscillator the frequency of which is determined as will be presently described.

The firing circuit E further utilizes a transistor 90 having a base 91 an emitter 92 and a collector 93. Emitter 92 is connected by means of a conductor 94 to conductor 62. Collector 93 is connected by means of a conductor 95 to a resistor 96 which in turn is connected by means of a conductor 97 to a condenser 98. This condenser is further connected by means of a conductor 99 to conductor 46. A conductor 79 is connected to conductor 97 and also to the emitter 81 of silicon unijunction transistor 80. The resistor 96 and condenser 98 serve as timing means, a charge of electricity building up in condenser 98 through resistor 96 and discharging to emitter 81 of silicon unijunction transistor 80 when the transistor 80 fires.

The control circuit D includes a tachometer 100 which is directly driven from the driven shaft 13 of the electro-magnetic slip coupling A. This tachometer produces a voltage proportional to the speed of the coupling output shaft 13. The output of tachometer 100 is connected by a conductor 101 to a variable resistor 102 which is further connected by a conductor 103 to the base 91 of transistor 90. The output of tachometer 100 is connected by means of a conductor 104 to the moving arm 105 of a potentiometer 106. One end of the resistor 107 of said potentiometer is connected to conductor 62 while the other end is connected by means of a conductor 108 to a dropping resistor 109. This resistor is further connected to the conductor 46. A voltage regulator 110 is connected across the resistor 107 by means of conductors 111 and 112.

The stabilizing circuit G as previously referred to includes the transformer 50 whose primary 51 is connected in series with the winding 17 of the electro-magnetic slip coupling A. The secondary of this transformer is connected by means of conductors 53 and 54 across the resistor 102.

While the invention as described would operate satisfactorily with resistive loads it has been found that the residual current resulting with inductive loads would prevent the silicon controlled rectifier 40 from shutting off. To overcome this difficulty a bleeder rectifier 55 is employed which is connected by means of conductors 56 and 57 to the conductors 46 and 49 and which bypasses the silicon control rectifier and reduces the current through said rectifier to substantially zero.

The following values of components have been found to perform satisfactorily and are the values of a speed control now about to be marketed.

40—General Electric silicon controlled rectifier No. C36B
80—General Electric silicon unijunction transistor No. 2N489
90—Transistor 2N1038
100—Tachometer, 6 volt/1000 r.p.m.
33—Rectifier, GE 4JA211BB1AC3
55—Rectifier, WX304-D
70—Zener diode, 27 volt, 10 watt
110—Zener diode, 6.2 volt, 200 mw.
60—Resistor, 2200 ohms, 2 watt
87—Resistor, 10 ohms, 2 watt
85—Resistor, 47 ohms, 2 watt
96—Resistor, 3300 ohms, 2 watt
102—Resistor, 200 ohms, adjustable, 4 w.
109—Resistor, 1000 ohms, 4 w.
98—Capacitor, 0.5 microfarad, 25 volt The method of operation of the variable speed drive is as follows:

Rectifier 33 is connected to a single-phase alternating-current line and produces half-wave voltage pulses all unidirectional. These voltage pulses are utilized for energizing the electro-magnetic slip coupling and also for actuating the other elements of the invention. For the latter purpose direct current is desired. The voltage shaping circuit F produces such voltage. The Zener diode 70 clips the tops of the pulses leaving flat top pulses substantially continuous across conductors 46 and 62 as long as the silicon controlled rectifier 40 is passing only leakage current. As soon as said rectifier fires and passes appreciable current the voltage across conductors 46 and 62 becomes practically zero.

Assume that the power output shaft 13 is running at a predetermined speed and that such speed is being maintained, potentiometer 106 being set for the desired speed. At such position of the potentiometer the voltage of the tachometer 100 is below that of the reference voltage between contact 105 of potentiometer 106 and the return conductor 62. A negative voltage is hence impressed on the base 91 of transistor 90. Current hence flows through the emitter 92 and collector 93 of said transistor and charges capacitor 98 through resistor 96. The voltage then builds up until the voltage at the emitter 81 of silicon unijunction transistor 80 reaches its peak value. The transistor then fires allowing the capacitor 98 to discharge through conductor 79 and emitter 81 of said transistor and through base 82 conductors 84 and 88, resistor 87, and conductor 89 to the gate 43 of the silicon controlled rectifier 40. The firing pulse produced by the transistor 80 then fires the silicon controlled rectifier 40 and said rectifier commences to pass a power pulse produced by the rectifier 33. The elapsed portion of the pulse cycle before the rectifier fires determines the amount of power fed to the winding 17. When the variable drive is running at the assumed speed, the instant of firing of said rectifier is maintained at such time as will produce the desired current in the winding 17.

Suppose now that the load is increased but the same assumed speed is to be maintained. The current supplied by silicon controlled rectifier 40 would hence be insufficient and so the speed starts to drop. The voltage of the tachometer 100 then drops making the base 91 of transistor 90 more negative. Transistor 90 now passes more current and capacitor 98 is charged at a faster rate. The silicon unijunction transistor 80 hence fires sooner and correspondingly the silicon controlled rectifier 40 fires sooner and the rectifier hence passes more current. This causes the electro-magnetic slip coupling to speed up and the speed increases until the tachometer voltage bears the proper relation to the reference voltage to produce the assumed speed. The reverse is true when the load is decreased.

Suppose now that a lower speed is desired with the same load. The movable contact 105 of potentiometer 106 would then be moved toward conductor 62. This would make the potential at base 91 of transistor 90 less negative and the current flow to capacitor 98 would be reduced. A longer time would then be required to charge said capacitor and the rectifier 40 would fire at a later time in the power pulse cycle and deliver less energy to the winding 17. The shaft 22 would hence rotate at a slower speed until the relation between tachometer voltage and reference voltage was such as to maintain the desired decrease in speed.

The advantages of the invention are manifest. The variable-speed drive utilizing the instant invention has a rapid response, is positive in action and is highly reliable. The components of the invention are rugged in construction and can be housed in a minimum amount of space. The circuits are operable over a wide temperature range, and are not sensitive to variation in humidity. The construction can be built at an economical cost.

Changes in the form of the invention, as herein described, may be made within the scope of what is claimed without departing from the spirit of the invention.

Having described the invention what is claimed as new and desired to be protected by Letters Patent is:

1. In a variable-speed drive having an electro-magnetic slip coupling provided with a winding and an input circuit connected to said winding, the combination of a power circuit connected to said input circuit and producing a unidirectional full-wave pulsating voltage, a silicon controlled rectifier in said input circuit and including a gate, a firing circuit connected to said gate and adapted to cause said silicon controlled rectifier to fire at various times within each pulse cycle, and a control circuit connected to said firing circuit and determining the particular time in each cycle at which said silicon controlled rectifier fires.

2. In a variable-speed drive having an electro-magnetic slip coupling provided with a winding and an input circuit connected to said winding, the combination of a power circuit connected to said input circuit and producing a pulsating voltage, a silicon controlled rectifier in said input circuit and including a gate, a firing circuit including a silicon unijunction transistor having a base connected to said gate and further having an emitter, means for impressing at the emitter of said unijunction transistor the voltage from the output of said silicon controlled rectifier to cause said silicon controlled rectifier to fire once during each of the cycles of said pulses and a control circuit controlling the time in each cycle when the silicon controlled rectifier is fired.

3. In a variable-speed drive having an electro-magnetic slip coupling provided with a winding and an input circuit connected to said winding, the combination of a power circuit connection to said input circuit and producing a unidirectional full-wave pulsating voltage, a silicon controlled rectifier in said input circuit and including a gate, a firing circuit connected to said gate and adapted to cause said silicon controlled rectifier to fire at various times within each pulse cycle, a rectifier in said input circuit shunting said winding and discharging the residual electric energy developed in said winding to reduce the current through said rectifier to approximately zero to re-set said silicon controlled rectifier for operation for the following cycle.

4. In a variable-speed drive having an electro-magnetic slip coupling provided with a winding and an input circuit connected to said winding, the combination of a power circuit connected to said input circuit and producing a pulsating voltage, a silicon controlled rectifier in said input circuit and including a gate, a firing circuit including a silicon unijunction transistor having a base connected to sad gate and further having an emitter, means for impressing at the emitter of said unijunction transistor the voltage from the output of said silicon controlled rectifier to cause said silicon controlled rectifier to fire once during each of the cycles of said pulses, time delay means in said firing circuit determining the time in each pulse cycle when said silicon controlled rectifier fires, and an adjustable control circuit for controlling the operation of said time delay means to cause said silicon controlled rectifier to fire at predetermined times in each cycle.

5. In a variable-speed drive having an electro-magnetic slip coupling provided with a winding and an input circuit connected to said winding, the combination of a power circuit connected to said input circuit and producing a pulsating voltage, a silicon controlled rectifier in said input circuit and including a gate, a firing circuit including a silicon unijunction transistor having a base connected to said gate and further having an emitter, means for impressing at the emitter of said unijunction transistor the voltage from the output of said silicon controlled rectifier to cause said silicon controlled rectifier to fire once during each of the cycles of said pulses, time delay means in said firing circuit including a timing capacitor and a resistor and further including a transistor for charging said capacitor through said resistor and a control circuit connected to said transistor and controlling the output thereof to control the time in each pulse cycle when said silicon controlled rectifier fires.

6. In a variable-speed drive having an electro-magnetic slip coupling provided with a winding and an input circuit connected to said winding, the combination of a power circuit connected to said input circuit, a full-wave bridge rectifier in said power circuit producing unidirectional voltage pulses fed to said winding, a silicon controlled rectifier in said input circuit having a gate and limiting the pulses reaching said winding to pulses of a single polarity, a firing circuit connected to said gate and adapted to cause said silicon controlled rectifier to fire at various times within the pulse cycle and a control circuit connected to said firing circuit and controlling the particular time in each cycle at which said silicon controlled rectifier fires.

7. In a variable-speed drive having an electro-magnetic slip coupling provided with a winding and an input circuit connected to said winding, the combination of a power circuit connected to said input circuit and producing a pulsating voltage, a silicon controlled rectifier in said input circuit and including a gate, a firing circuit including a silicon unijunction transistor having a base connected to said gate and further having an emitter, means for impressing at the emitter of said unijunction transistor the voltage from the output of said silicon controlled rectifier to cause said silicon controlled rectifier to fire once during each of the cycles of said pulses, time delay means in said firing circuit including a timing capacitor and a resistor and further including a transistor for charging said capacitor through said resistor, a stabilizing circuit including a transformer having a primary connected in series with said winding and a secondary connected to the emitter of said transistor, and a control circuit connected to said transistor and to said secondary and controlling the output thereof to control the time in each pulse cycle when said silicon controlled rectifier fires.

8. In a variable-speed drive having an electro-magnetic slip coupling provided with a winding and an input circuit connected to said winding, the combination of a power circuit connected to said input circuit, a full-wave rectifier in said power circuit producing across said winding a pulsating unidirectional voltage, a silicon controlled rectifier in said input circuit controlling the flow of current through said winding and including a gate, a firing circuit for actuating said silicon controlled rectifier and including a silicon unijunction transistor having an emitter, the output of said transistor being connected to said gate, said firing circuit further including a transistor having a collector and a base, timing means connected to said collector and to the emitter of said silicon unijunction transistor, and an adjustable control circuit connected to the base of said second named transistor.

9. In a variable-speed drive having an electro-magnetic slip coupling provided with a winding and an output circuit connected to said winding, the combination of a power circuit connected to said input circuit, a rectifier in said power circuit producing across said winding a pulsating voltage, a silicon controlled rectifier in said input circuit controlling the flow of current through said winding and including a gate, a firing circuit for actuating said silicon controlled rectifier and including a silicon unijunction transistor having an emitter, the output of said transistor being connected to said gate, said firing circuit further including a transistor having a collector and a base, timing means connected to said collector and to the emitter of said silicon unijunction transistor, and an adjustable control circuit including a tachometer driven by said electro-magnetic slip coupling and connected to the base of said second named transistor and to a variable resistor, said resistor being connected across the source of reference voltage and adjustable to produce a voltage drop opposite in polarity to the voltage produced by said tachometer to control the current fed to the base of said last named resistor and finally to said winding.

References Cited in the file of this patent

UNITED STATES PATENTS

| | | |
|---|---|---|
| 2,760,611 | Jaeschke | Aug. 28, 1956 |
| 2,817,028 | Winther | Dec. 17, 1957 |
| 2,920,240 | Macklem | Jan. 5, 1960 |